United States Patent
Choudhary et al.

(10) Patent No.: US 7,856,600 B2
(45) Date of Patent: *Dec. 21, 2010

(54) SYSTEM AND METHOD FOR USER DRIVEN INTERACTIVE APPLICATION INTEGRATION

(75) Inventors: Samar Choudhary, Cary, NC (US); John M. Lucassen, Katonah, NY (US); Shankar Ramaswamy, Chapel Hill, NC (US); Sai Gopala Rathnam, Seven Fields, PA (US); Amber Roy-Chowdhury, Cary, NC (US); Douglass J. Wilson, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 735 days.

This patent is subject to a terminal disclaimer.

(21) Appl. No.: 11/774,603

(22) Filed: Jul. 8, 2007

(65) Prior Publication Data

US 2007/0250780 A1 Oct. 25, 2007

Related U.S. Application Data

(63) Continuation of application No. 10/448,968, filed on May 30, 2003, now Pat. No. 7,281,217.

(51) Int. Cl.
G06F 3/048 (2006.01)
G06F 3/00 (2006.01)
G06F 15/16 (2006.01)

(52) U.S. Cl. .............. 715/764; 715/762; 715/763; 715/765; 715/769; 715/780; 715/738; 715/739; 715/742; 715/853; 709/203; 709/218; 709/228

(58) Field of Classification Search .......... 715/762–765, 715/780, 853, 769, 906, 738–739, 741; 709/203, 709/218, 228

See application file for complete search history.

(56) References Cited

U.S. PATENT DOCUMENTS 6,918,088 B2 * 7/2005 Clark et al. ................. 715/742

(Continued)

OTHER PUBLICATIONS

Microsoft Corporation; Interoperability between Microsoft Office SharePoint Server 2007, BEA WebLogic Portal, and IBM WebSphere Portal (with Mainsoft) ; Aug. 2008; 40 pages; http://interopvendoralliance.org/media/1243/IVA_Portal_Interoperability_White_Paper.pdf.*

*Primary Examiner*—Dennis-Doon Chow
*Assistant Examiner*—Linh K Pham
(74) *Attorney, Agent, or Firm*—Van Leeuwen & Van Leeuwen

(57) ABSTRACT

A system and method is provided for integrating portlets. When viewing portlets within a portal container, a user is presented with a choice of one or more sources of data and, for each source, one or more actions that the user can take regarding the source. When an action is selected, it causes the source data to be transferred to one or more "target" portlets that have also been activated by the user. The set of actions available from a given source is automatically provided given the available target portlets. As each portlet is initialized, it informs a "broker" of the actions that the portlet supports along with the type of data that is used by the action. When a portal page is being constructed, each portlet identifies to the broker the sources of data within the portlet along with the values and data types corresponding to the sources.

15 Claims, 11 Drawing Sheets

U.S. PATENT DOCUMENTS

| | | | | |
|---|---|---|---|---|
| 6,920,615 | B1* | 7/2005 | Campbell et al. | 715/742 |
| 7,100,165 | B2* | 8/2006 | Eldridge et al. | 719/316 |
| 7,240,067 | B2* | 7/2007 | Timmons | 1/1 |
| 7,281,217 | B2* | 10/2007 | Choudhary et al. | 715/764 |
| 2003/0055878 | A1* | 3/2003 | Fletcher et al. | 709/203 |
| 2003/0149722 | A1* | 8/2003 | Jolley et al. | 709/203 |
| 2003/0167315 | A1* | 9/2003 | Chowdhry et al. | 709/218 |
| 2003/0188163 | A1* | 10/2003 | Fischer et al. | 713/170 |
| 2004/0010598 | A1* | 1/2004 | Bales et al. | 709/228 |
| 2004/0199392 | A1* | 10/2004 | Khatri et al. | 704/277 |
| 2004/0199497 | A1* | 10/2004 | Timmons | 707/3 |

\* cited by examiner

| Target Table 500 |||
|---|---|---|
| Target Portlet Name 505 | Input Parameter 510 | Action 515 |
| Customer 525 | Datatype = Customer_ID Other Metadata = add'l data 530 | Name = Get_Customer Other Metadata = add'l data 535 |
| Account Details 545 | Datatype = Order_ID Other Metadata = add'l data 550 | Name = Get_Account Other Metadata = add'l data 555 |
| Order Details 565 | Datatype = Order_ID Other Metadata = add'l data 570 | Name = Get_Order_Details Other Metadata = add'l data 575 |
| Tracking Details 585 | Datatype = Tracking_ID Other Metadata = add'l data 590 | Name = Get_Tracking_Details Other Metadata = add'l data 595 |

*Figure 5*

SYSTEM AND METHOD FOR USER DRIVEN INTERACTIVE APPLICATION INTEGRATION

RELATED APPLICATION

This application is a continuation of application Ser. No. 10/448,968 filed May 30, 2003, now U.S. Pat. No. 7,281,217 titled "System and Method for User Driven Interactive Application Integration," and having the same inventors as the above-referenced application.

BACKGROUND OF THE INVENTION

1. Technical Field

The present invention relates in general to a system and method for integrating applications based upon a user's actions. More particularly, the present invention relates to a system and method of integrating portlets so that source portlets are able to automatically provide data to target portlets.

2. Description of the Related Art

The portal market is one of the fastest growing markets of computer software. A portal in the present invention may be defined as an application which provides a secure, single point of interaction with diverse information, business processes, and people, personalized to a user's needs and responsibilities. A portal, or "Web portal," is a Web site or service that offers a broad array of resources and services, such as e-mail, forums, search engines, and on-line shopping malls. Portals are typically accessed by a user on the Internet using a software application, such as a Web browser. A Web browser, or "browser," is a software application used to locate and display Web pages. The two most popular browsers are Netscape Navigator™ and Microsoft Internet Explorer™. Both of these are graphical browsers, which means that they can display graphics as well as text. In addition, most modern browsers can present multimedia information, including sound and video, though they often require plug-ins in order to handle some formats.

The demand for portals drives rapid development of new technologies by different portal vendors in order to place their products in advantageous market positions. Not surprisingly, portals have evolved to their current state from a more primitive beginning. Originally, portals were mainly used as access points to different information sources with content being chosen by the portal operator. Next, portal customization provided users with the ability to choose the content that was displayed on the user's view of the portal using a Web browser. In this phase, the user was able to select information according to the user's interests and retrieve information related to his or her interests more expeditiously. Customized information delivery led to the introduction of business, or corporate, portals. Business portals were introduced to provide intra-business data within an organization.

The ongoing evolution of portals also left its footprint in the architecture of portal products. At first, portal-like products were delivered as pre-packaged applications that could be installed out of the box and included standard applications, which provided the portal functionality. As new applications were needed, vendors extended their products in order to satisfy requirements of the new applications. Due to the use of proprietary designs, portal vendors exclusively added functionality to their portals, tying the success of a portal to the applications that the portal included. This led to the decomposition of monolithic structures and the creation of portal frameworks.

Portal products offered today employ architectures whereby the portal itself only implements standard functionality, such as security, authorization, authentication, aggregation, caching, user management, enrollment, rendering, and the like. The portal provides the infrastructure to integrate other application components. This architecture includes APIs for integrating applications so that applications from different vendors can be used so long as they match the portal product's API. In the portal environment, these applications are commonly called "portlets."

Portlets are components that can be added to portals and are designed to run inside a portal's portlet container. Portlets may provide different functions ranging from simple rendering of static or dynamic content to application functions such as e-mail, electronic calendaring, and the like. Portlets are invoked indirectly via the portal infrastructure and produce content that is suited for aggregation in larger pages.

While portlets allow separation of application components from each other and from the underlying portal, a challenge of using portlets is the difficulty in transmitting data that appears on one portlet to another portlet. For example, if one portlet displays orders for an organization and another portlet displays details for orders, vendors would have to "couple" the portlets to allow the user to send data from one portlet to another. In a business system, many portlets may be driven from the same pieces of information, such as order numbers, account numbers, and customer numbers. Closely coupling portlets to one another increases development requirements and maintenance of each portlet. In addition, coupling portlets may require activation of each of the coupled portlets even though the user only wants to view a subset of the coupled portlets.

What is needed, therefore, is a system and method for integrating portlets so that data items existing on "source" portlets can be used to populate data and drive actions on other "target" portlets. In addition, a set of "actions" the user can take should be determined and made available based upon the currently activated target portlets, without having to couple individual portlets to one another.

SUMMARY

A system and method for addressing the aforementioned challenges is provided. When viewing portlets within a portal container, a user is presented with a choice of one or more sources of data and, for each source, one or more actions that the user can take regarding the source. When an action is selected, it causes the source data to be transferred to one or more "target" portlets that have also been activated by the user. The set of actions available from a given source is automatically provided given the available target portlets.

As each portlet is initialized, it informs a "broker" of the actions that the portlet supports along with the type of data that is used by the action. When a portal page is being constructed, each portlet identifies to the broker the sources of data within the portlet along with the values and data types corresponding to the sources. The broker uses the identification of actions and source data types to determine a set of matching actions for each source. In addition, special "broadcast" actions are provided so that the user can request that a data value be sent to multiple portlets using actions that correspond to each of the portlets. Icons are dynamically rendered next to source data items as a result of the matching. When the user selects, or "clicks," on the icon only the set of valid actions is displayed, depending upon the available portlets that have actions ready to accept the source data type.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1A is a screen diagram showing five portlet screens on a display with one of the portlets currently being used by the user to perform actions on one or more of the other portlets;

FIG. 1B is a screen diagram showing the result of the actions performed as a result of the user selection in FIG. 1A;

FIG. 5 is a table used to show data collected regarding target portlets (i.e., portlets configured to receive data from source portlets);

DETAILED DESCRIPTION

Figure 2A:
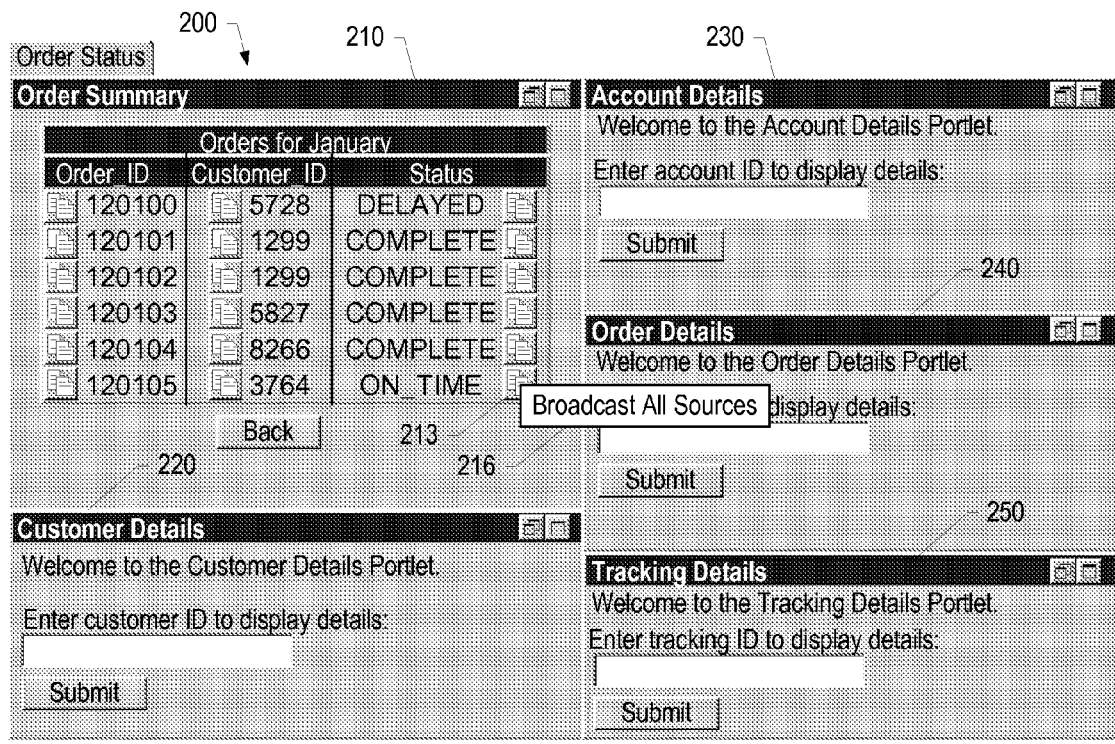
FIG. 2A is a screen diagram showing five portlet screens on a display with one of the portlets currently being used by the user to broadcast all actions currently available on a set of source data items on a source portlet to one or more of the other portlets.

The following is intended to provide a detailed description of an example of the invention and should not be taken to be limiting of the invention itself. Rather, any number of variations may fall within the scope of the invention, which is defined in the claims following the description.

Figures 1A, 1B:
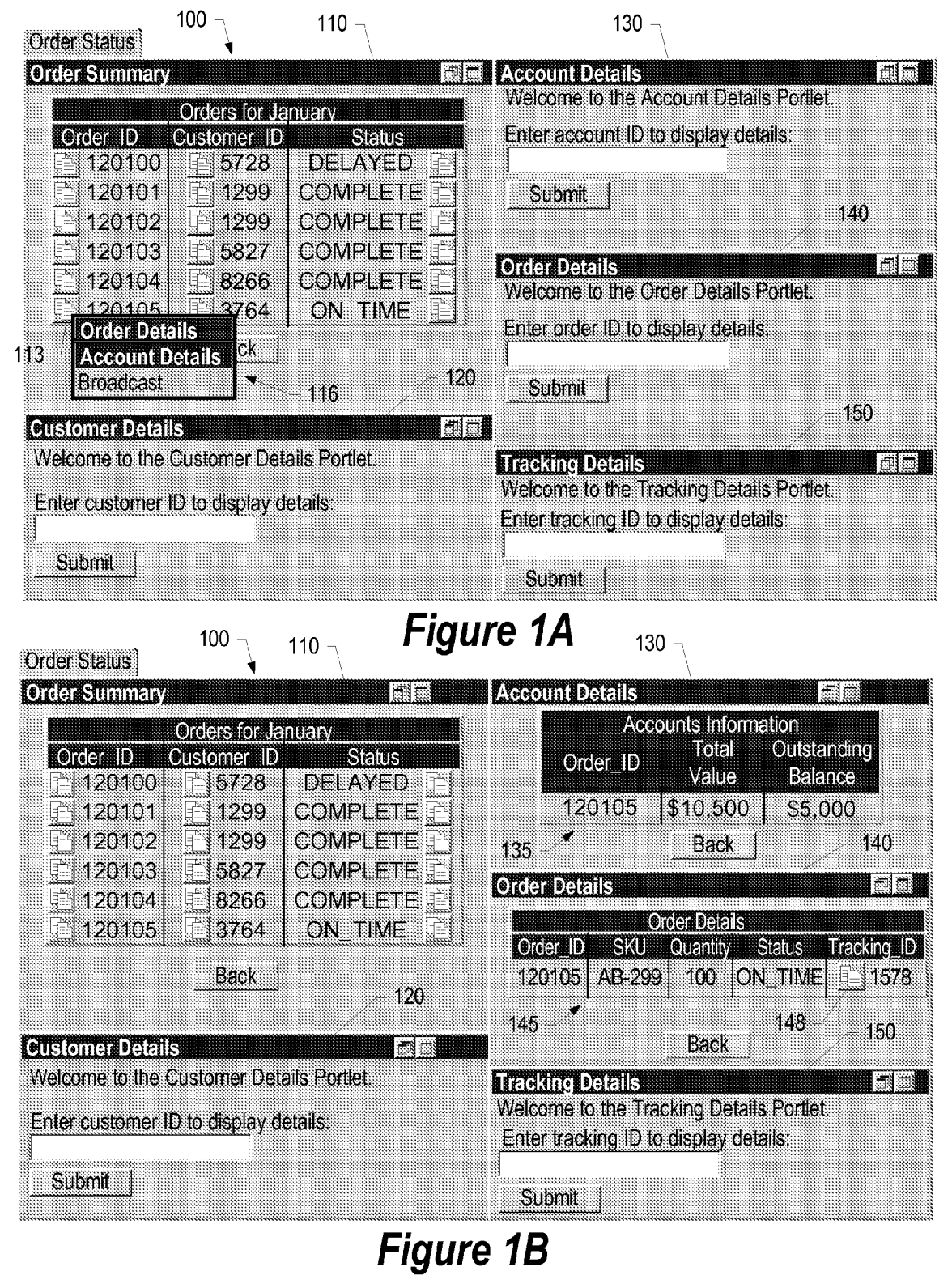

FIG. 1A is a screen diagram showing five portlet screens on a display with one of the portlets currently being used by the user to perform actions on one or more of the other portlets. Display 100 is a display connected to a computer system for displaying data resulting from a computer program, such as an Internet browser application. In the example shown, display 100 includes five windows for displaying data corresponding to five different portlets. Window 110 is used for displaying data for an order summary portlet, window 120 is used for displaying data for a customer detail portlet, window 130 is used for displaying data for an account details portlet, window 140 is used for displaying data for an order details portlet, and window 150 is used for displaying data for a tracking details portlet. While each of the five portlets have been activated, they might not all be "viewable" at one time by the user. For example, each of the windows may be "maximized" so that only the window that has focus is viewable by the user. Focus to other windows can be accomplished by the user selecting one of the other windows.

Icons 113 are displayed alongside data in response to the system recognizing that the data is a source data type for one or more of the other portlets that have been activated on display 100. In the example shown, icons 113 correspond to the "Order_ID" data field displayed within the order summary. In response to a user selecting one of the icons (e.g., clicking on the icon using a pointing device such as a mouse), pop-up menu 116 is displayed. As illustrated in pop-up menu 116, the Order_ID data type can be used as a source for two other currently activated portlets: the Order Details portlet (window 140) and the Account Details portlet (window 130). In other words, both the Order Details and Account Details portlets are able to accept an Order ID as an input parameter to retrieve information and display it on the respective portlets. In addition, a "Broadcast" menu item appears in pop-up menu 116. The "Broadcast" menu item can be selected to send the data, in this case the Order_ID, to all portlets being displayed that accept this information, namely the Order Details and Account Details portlets.

FIG. 1B is a screen diagram showing the result of the actions performed as a result of the user selection in FIG. 1A. Specifically, the screen diagram in FIG. 1B shows what results from the user selecting the "Broadcast" function from pop-up menu 116 that was displayed in FIG. 1A. In response to the user selecting to broadcast the Order_ID data for order "120105," the Account Details portlet displays Account Information 135 corresponding to order "120105," and the Order Details portlet displays Order Details data 145 also corresponding to order "120105." Note that one of the data fields (the Tracking_ID field) in the Order Details data also includes an icon indicating that this data type is an input to at least one of the other portlets activated and displayed on screen 100. In the manner shown above, the user was able to provide input parameter data to one or more portlets without having to enter such input data into the input fields on the respective portlets.

FIG. 2A is a screen diagram showing five portlet screens on a display with one of the portlets currently being used by the user to broadcast all actions currently available for a set of data items from the source portlet to one or more of the other portlets. Screen 200 is substantially similar to screen 100 shown in FIGS. 1A and 1B, with windows 210, 220, 230, 240, and 250 being used to display information corresponding to the Order Summary portlet, the Customer Details portlet, the Accounts Details portlet, the Order Details portlet, and the Tracking Details portlet, respectively. However in FIG. 2A the user has selected one of the "click to action" icons 213 that appear at the end of rows in the Order Summary portlet. In response to selecting icon 213, pop-up display 216 appears with a menu item that allows the user to "Broadcast All Sources." When the "Broadcast All Sources" item is selected, each of the fields within the row will be used to send data to one or more target portlets. In the example shown, the Order_ID "120105" will be sent to all portlets that take Order_ID as an input data type and the Customer_ID "3764" will be sent as an input data type to all portlets that take a Customer_ID as an input data type.

Figure 2B:
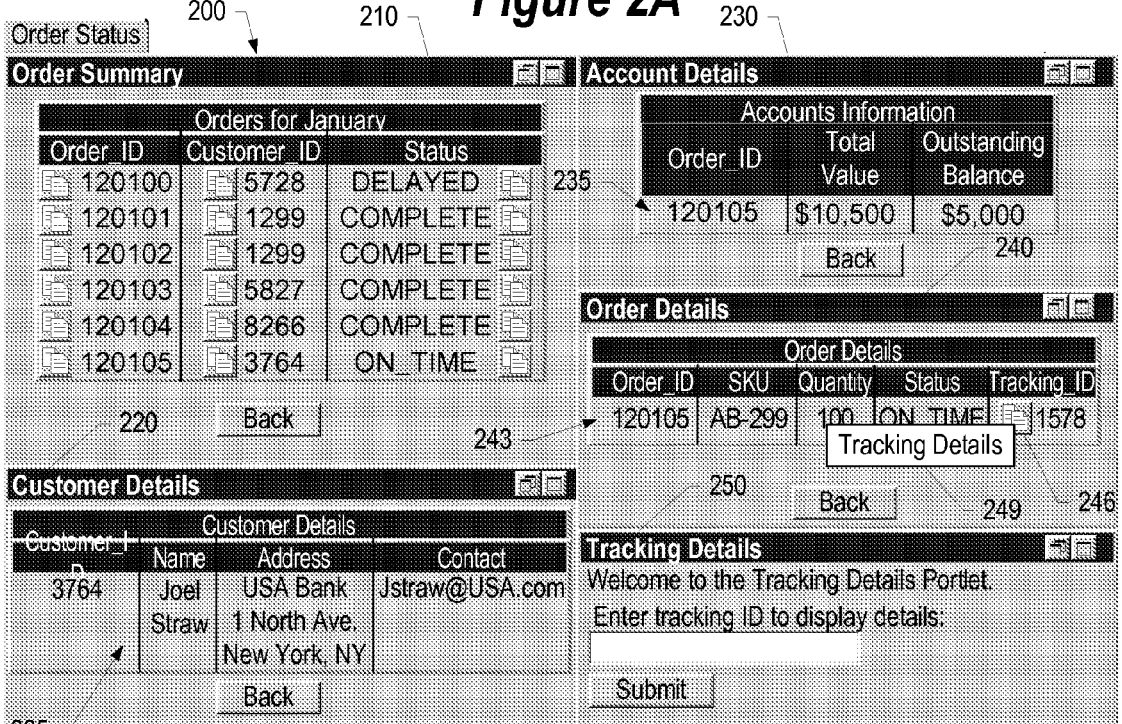
FIG. 2B is a screen diagram showing the result of the actions performed as a result of the user selection in FIG. 2A.

FIG. 2B is a screen diagram showing the result of the actions performed as a result of the user selecting "Broadcast All Sources" from the pop-up menu that appeared in FIG. 2A. Similar to the results shown in FIG. 1B, Accounts Information 235 and Order Details 243 now appear in the Account Details and Order Details portlets, respectively. In addition, Customer Details data 225 appears in Customer Details portlet 220 as a result of the Customer_ID "3764" being used as an input parameter to the Customer Details portlet. In addition, icon 246 appears in the order details portlet indicating that the Tracking_ID can be used as an input parameter to one or more other portlets being displayed. Pop-up menu 249 results from the user selecting icon 246 and indicates that the Tracking_ID can be used as an input parameter to the Tracking Details portlet. Because there is only one target portlet that takes a Tracking_ID as an input parameter, no "Broadcast" menu item appears in pop-up menu 249.

Figure 3:
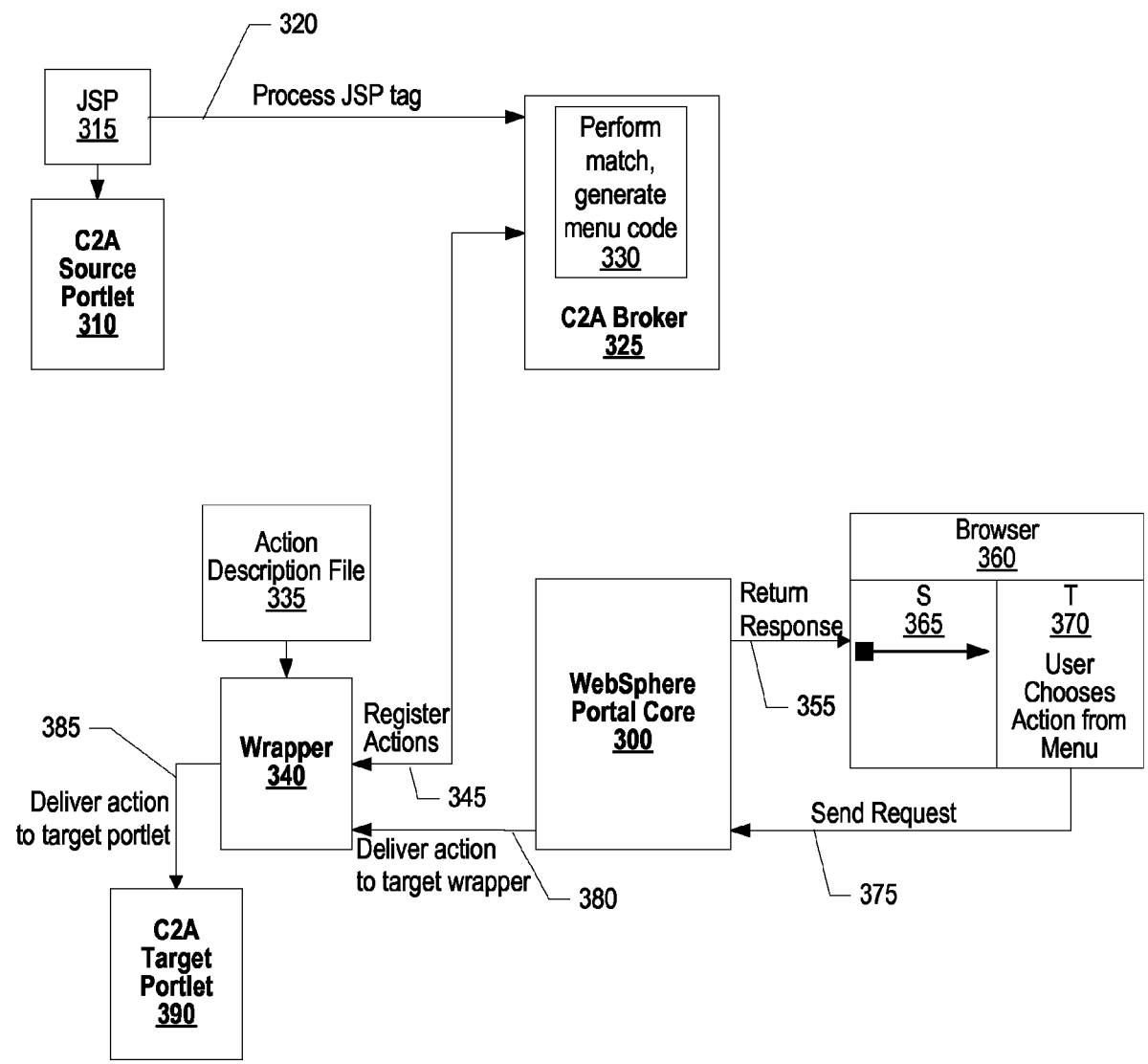
FIG. 3 is a system diagram showing data flowing between various components that are used to perform "click to action" functions.

FIG. 3 is a system diagram showing data flowing between various components that are used to perform "click to action" functions. Source portlet 310 and Target portlet 390 are portlets designed to process user requests and display responses to a user. Examples of portlets are shown in FIGS. 1A, 1B, 2A, and 2B. As can be seen by the examples, an individual portlet can be both a source portlet that provides input parameters to other (target) portlets, as well as a target portlet that receives and processes data sent from other (source) portlets.

During initialization, C2A ("Click-to-Action") Wrapper 340 processes any Action Description File 335 associated with C2A Target portlet 390 and registers these actions with C2A Broker 325 (dataflow 345, see FIG. 5 for a table showing example registered actions). Using the example system shown in FIGS. 1A-2B, if C2A Target portlet 390 is the "Order Details" portlet, then it registers an action named "Get_Order_Details" which takes an input parameter of type 'Order_ID', representing an Order Identifier. In this manner, Target portlet 390 has informed the system that it will accept data of the type "Order_ID." As will be explained in further detail below, when the system encounters other portlets (source portlets) that can provide data of type "Order_ID," then user interface controls are automatically constructed to link the two portlets. As shown in FIGS. 1A-2B, a user can select an order from the Order Summary portlet and, using the automatically rendered user interface, provide the corresponding Order Identifier to one or more portlets, such as the Order Details portlet, that have registered an action corresponding to the Order_ID data type.

During the render phase of a request cycle, JSPs associated with C2A Source portlet 310 are processed by JSP processor 315. The JSP tags produce calls (dataflow 320) to C2A Broker 325. C2A Broker 325 includes process 330 that examines the data type information to determine matching actions from the sets of actions registered by target portlets. C2A Broker 325 generates an icon to place next to data items displayed in C2A Source portlet 310 that can be used by a user to display a pop-up menu of actions, and adds code to send actions to target portlets upon a user's selection of the action from the pop-up menu.

When all render phase portlet callbacks are complete, WebSphere portal Core 300 assembles the response and returns it to the clients computer system, such as client's browser 360 in dataflow 355. The client's browser displays the page assembled by WebSphere portal Core 360 (process 365). Examples of browsers include Internet Explorer™ and Netscape Navigator™. When the user selects one of the C2A ("Click-to-Action") icons displayed in a Source portlet, he or she sees a menu of actions invocable on target portlets on the page which can process the data item(s) that the icon is associated with, and the user selects one of the actions from the menu (process 370). The user's selection of one of the actions in the menu results in a request (dataflow 375) being sent from the client back to the system (WebSphere portal Core 300). WebSphere portal Core 300 delivers the action to Target portlet 390 (dataflow 380). The action is intercepted by Wrapper 340. Actions that are invoked through direct interaction with the portlet, as opposed to interaction through the generated menus, are passed transparently through to the Target portlet (dataflow 385). In more advanced actions, such as "Broadcast" and "Broadcast All Sources" actions, Wrapper 340 determines the appropriate target set and delivers the correct data to the corresponding target portlets (dataflow 385).

Figure 4:
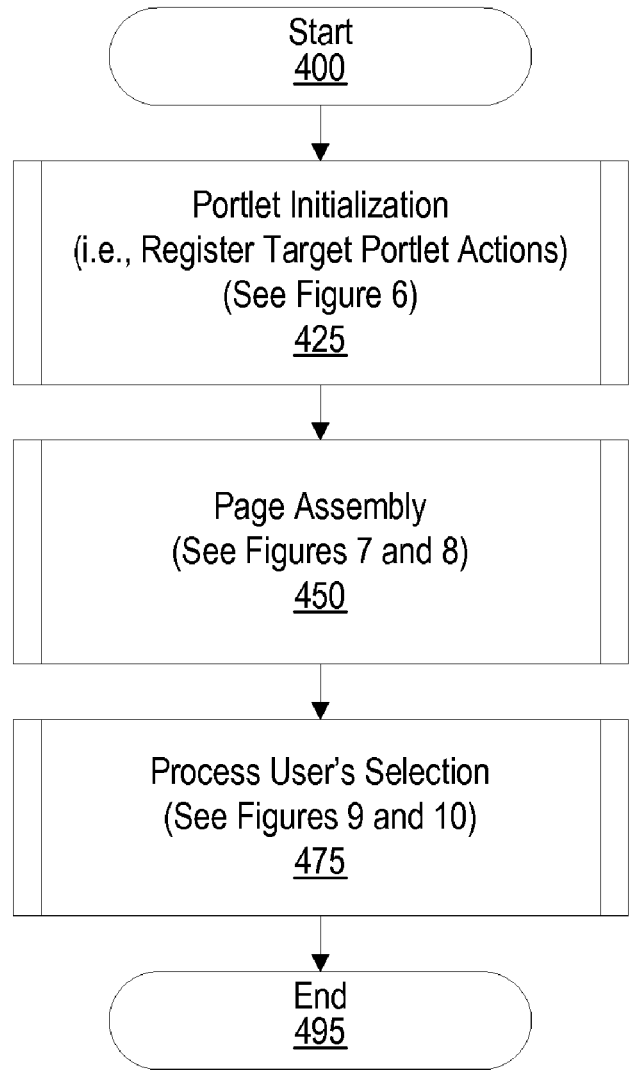
FIG. 4 is a high level flow diagram of the various high level steps used to perform "click to action" functions.

FIG. 4 is a high level flow diagram of the various high level steps used to perform "click to action" functions. Processing commences at 400 whereupon portlet initialization occurs (predefined process 425, see FIG. 6 for details). During portlet initialization, target actions corresponding to portlets are registered with a C2A Broker that matches portlets that provide data (source portlets) with portlets that have registered to receive and act upon such data (target portlets).

Figure 7:
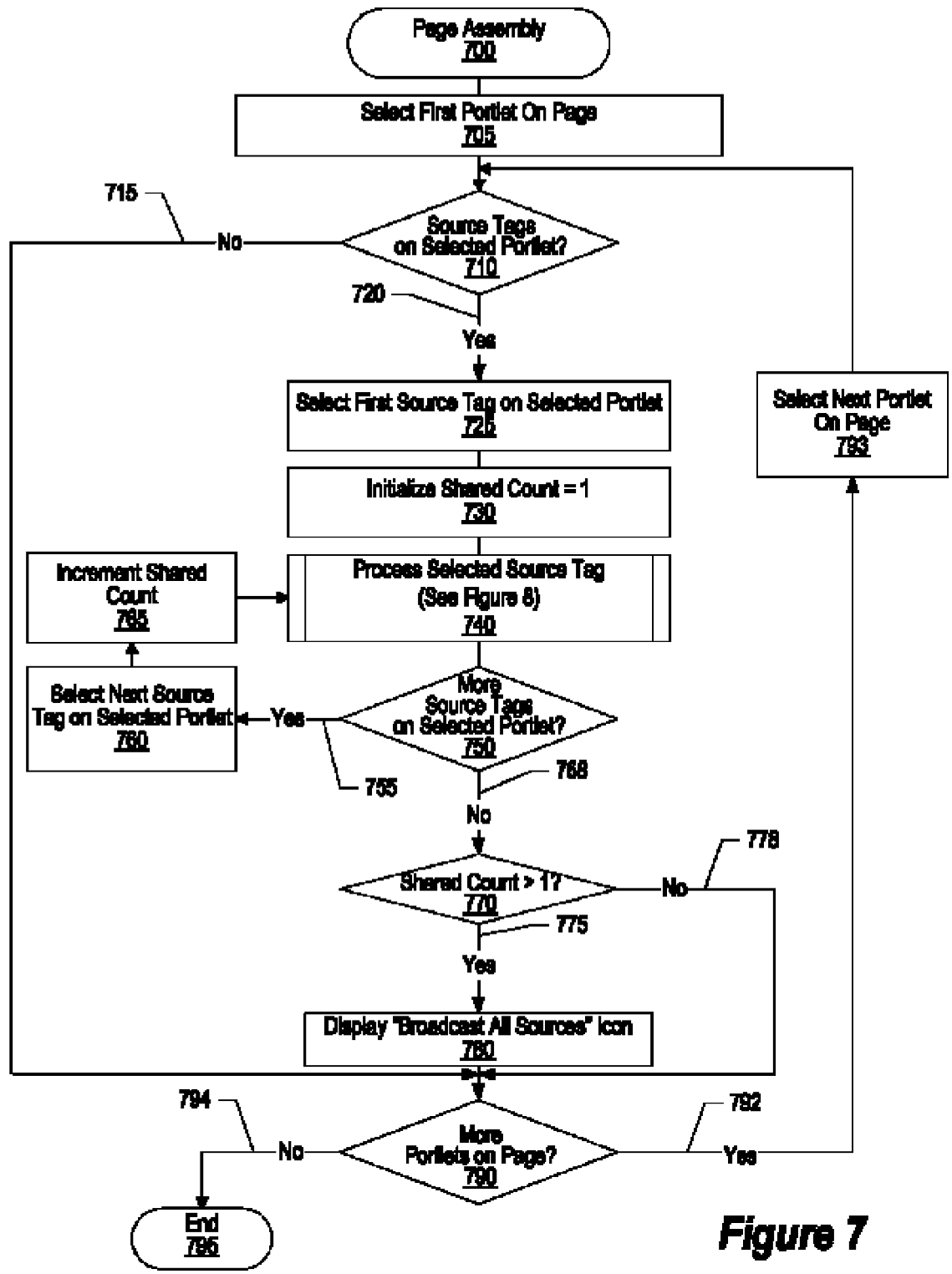
FIG. 7 is a flowchart illustrating the steps taken during the page assembly process.
Figure 8:
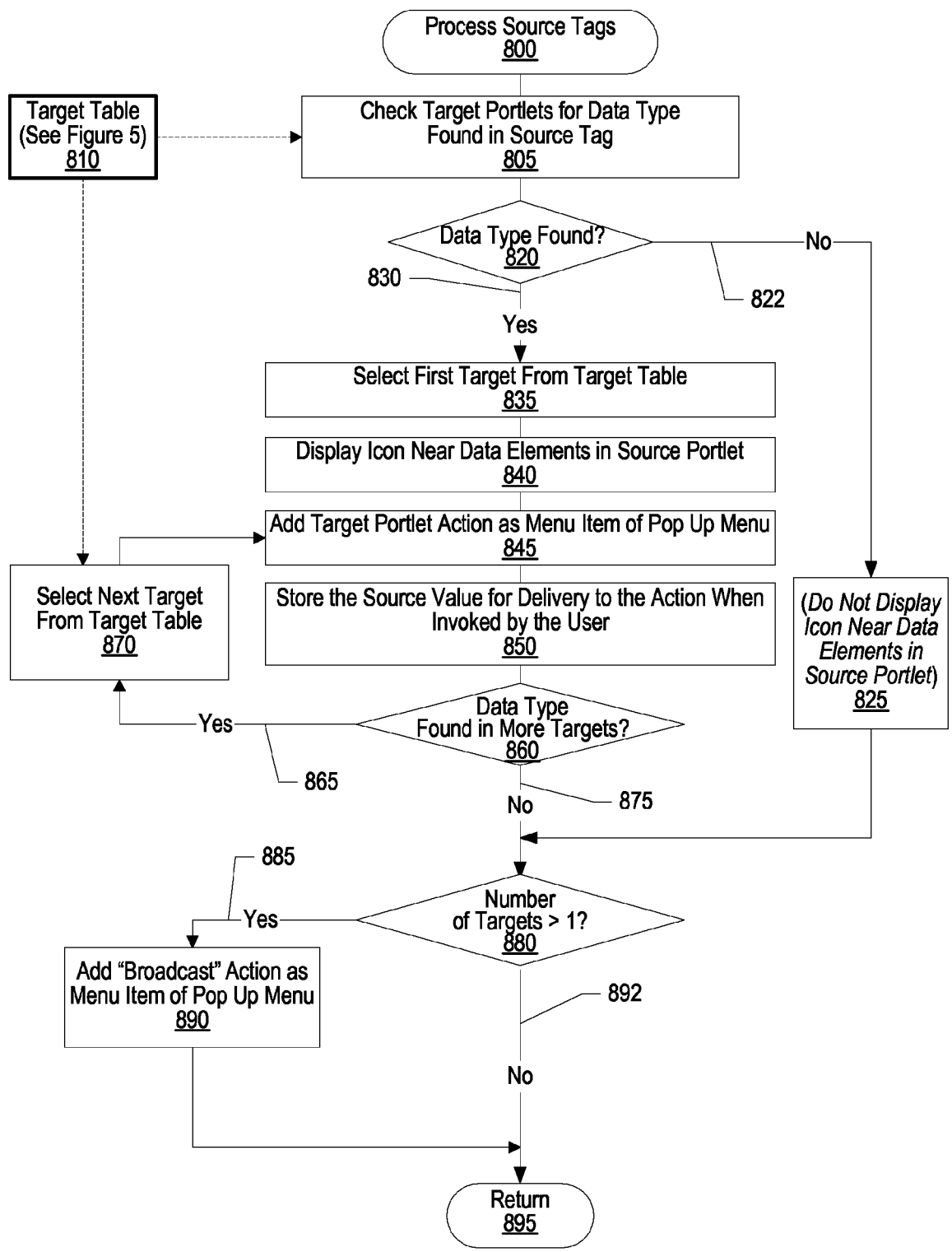
FIG. 8 is a flowchart illustrating the steps taken to process source tags found in portlets being displayed by the user.

After portlet initialization occurs, the user's page (such as a page displayed with a browser application) is assembled (predefined process 450, see FIGS. 7 and 8 for processing details). During page assembly, portlets which appear on the page (as determined by the user or an administrator) are displayed using an application such as a web browser. The portal and the C2A Broker work to render the view, including icons that identify source portlet data and pop-up menus that are displayed when a source portlet icon is selected. The icons are displayed by the C2A Broker matching the portlet data types with the data types of the input parameters of target actions that were previously registered during portlet initialization.

Figure 9:
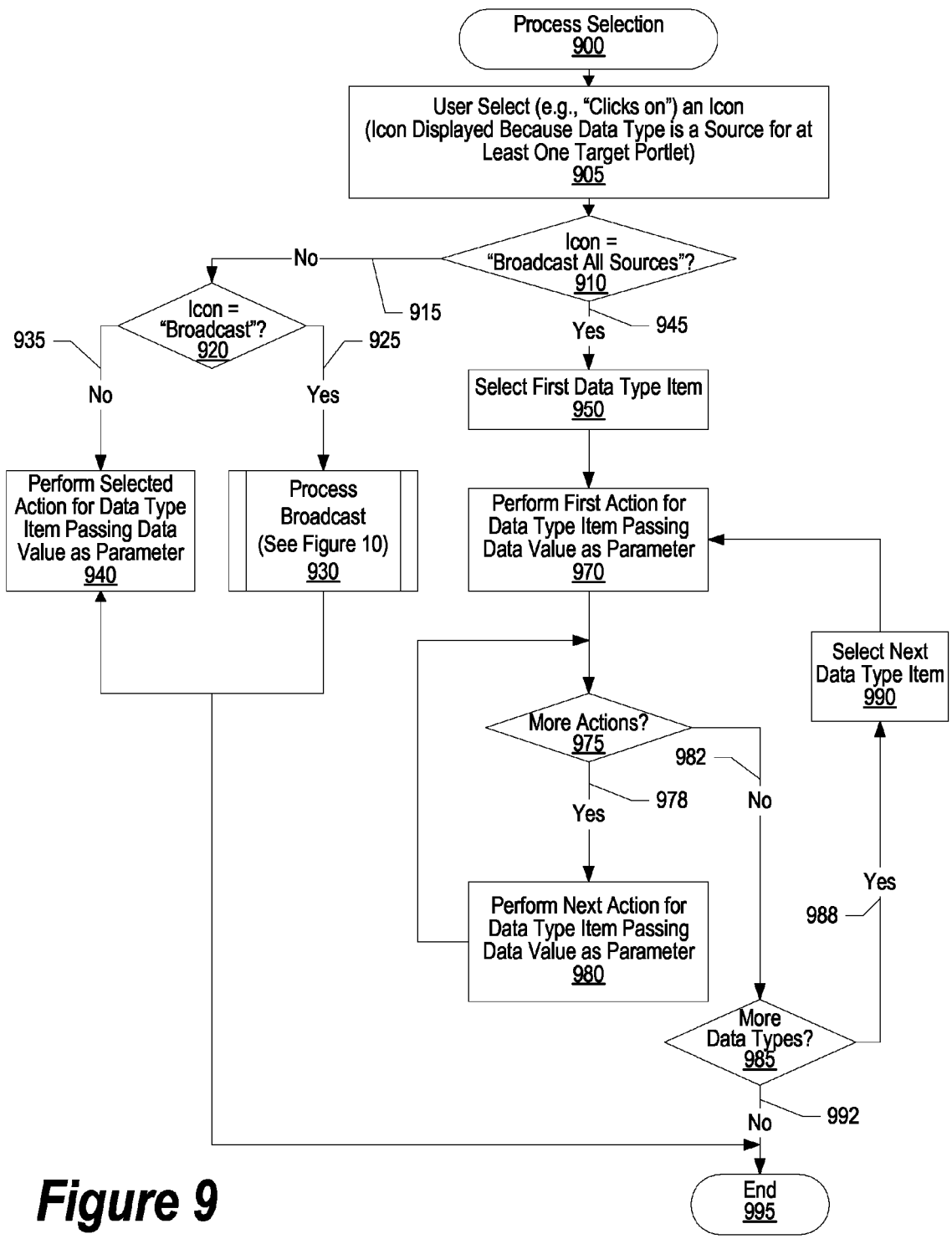
FIG. 9 is a flowchart illustrating the steps taken to process a user's selection.
Figure 10:
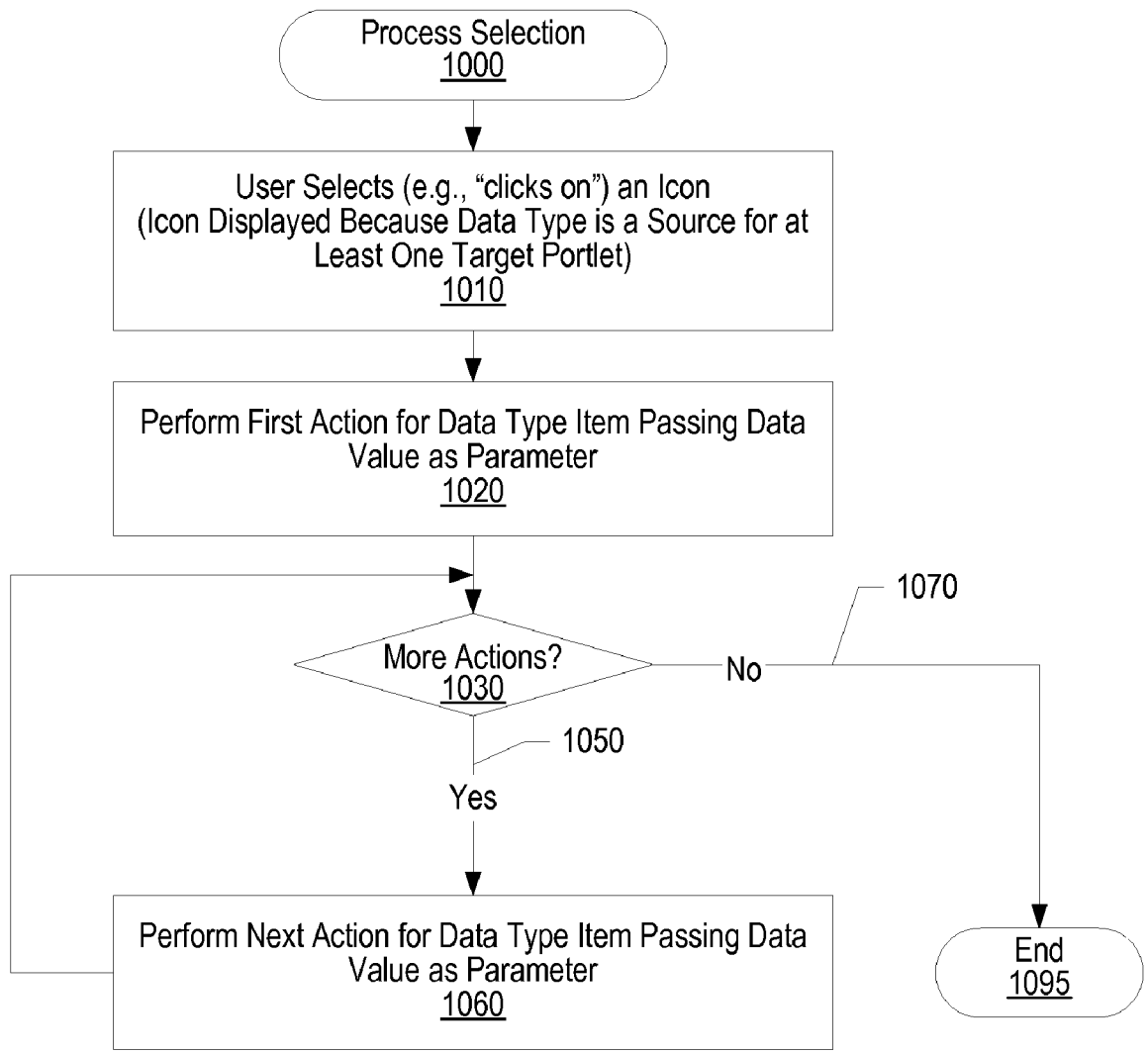
FIG. 10 is a flowchart illustrating the steps taken to process a "broadcast" type action.

Following portlet initialization and page assembly processes, the user's selection is able of being recognized and processed (predefined process 475, see FIGS. 9 and 10 for processing details). During user selection process, the user selects an icon on a source portlet and further selects an action from a pop-up menu corresponding to data displayed by the source portlet. Some actions are delivered directly to target portlets through their wrappers, while other actions (such as "Broadcast" and "Broadcast All Sources") are intercepted by the wrapper for the source portlet and disseminated to two or more portlets along with the data required by the individual portlets. Processing ends at 495.

FIG. 5 is a table used to show data collected regarding target portlets (i.e., portlets configured to receive data from source portlets). Target table 500 shows entries made by portlets registering their actions. Data fields 502 maintained by target table 500 include the name of the target portlet (column 505), actions that a target portlet implements (column 515) together with an input parameter for each action with a data type for each parameter (column 510). Input parameter (column 510) includes the name of the data type that the target portlet processes and may also include additional metadata to provide additional flexibility in passing the source value to the input parameter. The action (process) that should be performed when the user requests that data of the identified data type be processed by the target portlet (column 515) includes the name of the action and may also include additional metadata to provide additional flexibility when invoking the associated action.

The data shown in target table 500 corresponds to the target portlets shown in FIGS. 1A-2B. In FIG. 5, there are four rows of data corresponding to four target portlets. Row 520 is for the target portlet "Customer" 525. The data type that the target portlet takes as an input parameter is a "Customer_ID" 530. The action at the Customer portlet that is used to process an incoming Customer_ID is the Get_Customer process 535. If another portlet provides data of type "Customer_ID," then the action "Get_Customer" is included in the pop-up menu corresponding to the icon placed near the source Customer_ID data.

Row 540 is for the target portlet "Account Details" 545. The data type that the target portlet takes as an input parameter is "Order_ID" 550. The action at the Account Details portlet that is used to process an incoming Order_ID is the Get_Account process 555. If another portlet provides data of type "Order_ID," then the action "Get_Account" is included in the pop-up menu corresponding to the icon placed near the source Order_ID data.

Row 560 is for the target portlet "Order Details" 565.

The data type that the target portlet takes as an input parameter is "Order_ID" 570. The action at the Order Details portlet that is used to process an incoming Order_ID is the Get_Order_Details process 575. If another portlet provides data of type "Order_ID," then the action "Get_Account_Details" is included in the pop-up menu corresponding to the icon placed near the source Order_ID data.

Row 580 is for the target portlet "Tracking Details" 585. The data type that the target portlet takes as an input parameter is "Tracking_ID" 590. The action at the Tracking Details portlet that is used to process an incoming Tracking_ID is the Get_Tracking_Details process 595. If another portlet provides data of type "Tracking_ID," then the action "Get_Tracking_Details" is included in the pop-up menu corresponding to the icon placed near the source Tracking_ID data.

Figure 6:
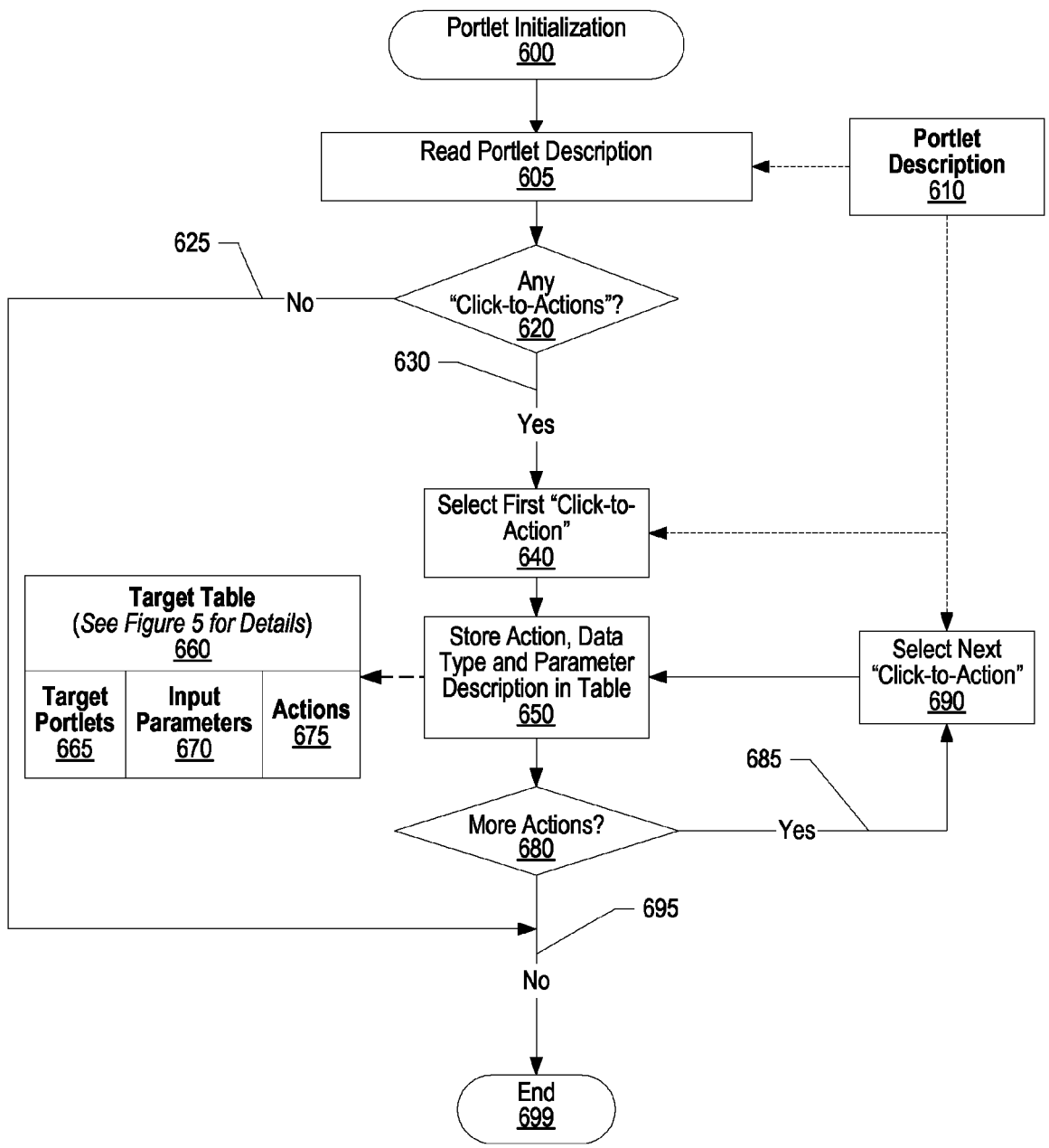
FIG. 6 is a flowchart illustrating the steps involved in initializing a portlet, including steps taken to populate the target portlet table.

FIG. 6 is a flowchart illustrating the steps involved in initializing a portlet, including steps taken to populate the target portlet table. Processing commences at 600 whereupon the portlet's description 610 is read (step 605).

A determination is made as to whether there are any "Click-to-Actions" included in the description (decision 620). In other words, a determination is made as to whether this portlet acts as a target portlet. If there are no "Click-to-Actions" included in the description, decision 620 branches to "no" branch 625 bypassing the initialization steps and processing ends at 699.

On the other hand, if there are "Click-to-Actions" included in the portlet's description, decision 620 branches to "yes" branch 630 to process the actions. The first "Click-to-Action" is selected from the portlet description (step 640). The retrieved action is stored along with the input parameter with associated data type to which the action responds, and the portlet's identifier (step 650). This data is stored in target table 660 which includes fields for storing the target portlet's identifier 665, the input parameter with associated data type that corresponds to the action 670, and the specific click-to-action 675.

A determination is made as to whether there are more input parameters with associated data types and actions to which this portlet responds (decision 680). If there are more input parameters with associated data types and actions to which this portlet responds, decision 680 branches to "yes" branch 685 whereupon the next action and input parameter with associated data type are selected (step 690) and processing loops back to process the next selected action and input parameter with associated data type. This looping continues until there are no more actions to process for this portlet, at which time decision 680 branches to "no" branch 695 and processing ends at 699.

FIG. 7 is a flowchart illustrating the steps taken during the page assembly process. Page assembly processing commences at 700 whereupon a first portlet that has been activated for a user (i.e., displayed on the user's display using a browser application) is selected (step 705). A determination is made as to whether there are source tags (i.e., JSP tags, etc.) that identify data included in the page as being a potential source, or input, data type for other portlets (decision 710). If there are no source tags on the selected portlet, decision 710 branches to "no" branch 715 bypassing steps taken to process source tags. On the other hand, if there are source tags found in the selected portlet, decision 710 branches to "yes" branch 720 whereupon the first source tag found on the portlet is selected (step 725). A counter is initialized to "1" (step 730). This counter is used to keep track of the number of shared source tags which are part of a group of related source tags on the selected portlet. The selected source tag is then processed (predefined process 740, see FIG. 8 for processing details). During the processing of the selected source tag, the system determines whether there are any other portlets (i.e., "target" portlets) that have been activated for this user and, if other portlets are activated, the system inserts one or more icons in the source portlet and builds a pop-up menu of actions that are available to the user when the user selects the icon.

A determination is made as to whether there are more source tags on the selected portlet (decision 750). If there are more source tags, decision 750 branches to "yes" branch 755 whereupon the next source tag is selected (step 760), the counter that keeps track of the number of source tags is incremented (step 765), and processing loops back to process the newly selected source tag. This looping continues until there are no more source tags to process on the selected portlet, whereupon decision 750 branches to "no" branch 768.

A determination is made as to whether the number of shared source tags on the selected portlet is greater than one (decision 770). If the number of source tags is greater than one, decision 770 branches to "yes" branch 775 whereupon one or more "Broadcast All Sources" icons are displayed on the portlet (step 780). The "Broadcast All Sources" icon allows the user to send data to run multiple actions with the selection of a single icon, rather than having to select each of the actions included in the various "click-to-actions" that are included in the various icons on the portlet. On the other hand, if the counter is not greater than 1, decision 770 branches to "no" branch 778 bypassing step 780.

A determination is made as to whether there are additional portlets that have been activated for use by the user (decision 790). If there are additional portlets, decision 790 branches to "yes" branch 792 whereupon processing selects the next portlet (step 793) and loops back to identify and process any source tags found in the newly selected portlet. This looping continues until all portlets activated for a user have been processed, at which time decision 790 branches to "no" branch 794 and processing ends at 795.

FIG. 8 is a flowchart illustrating the steps taken to process source tags found in portlets being displayed by the user. The steps shown in FIG. 8 are used to process an individual source tag that was encountered using the steps shown in FIG. 7. In FIG. 8, processing commences at 800 whereupon the source tag is used to match against target actions that were stored in target table 810 (step 805, see FIG. 5 for a description of the target table and FIG. 6 for details on how data is stored in the target table).

A determination is made as to whether any action with an input parameter whose data type matches the data type specified in the source tag was found in the target table (decision 820). If no match was found in the target table, indicating that no portlets have been activated for the user that have actions used to process the source's data type, then decision 820 branches to "no" branch 822 whereupon an icon is not placed near the data elements found in the source portlet (non-step 825), bypassing steps 835 through 870. On the other hand, if a match was found in the target table, decision 820 branches to "yes" branch 830 whereupon the first target (i.e., target portlet, target action, etc.) is selected from the target table (step 835). Icons are displayed near the source data elements found in the source portlet (step 840). The icons are used by the user to select a particular data element and, using a pop-up menu, select one or more target portlets to receive the data corresponding to the selected data element (i.e., a particular order, customer, etc.).

The target action is added as a menu item of the pop-up menu so that the menu item is available when the user selects the corresponding icon (step 845). The source value, such as an account or customer number, is stored for delivery to the action when invoked by the user (step 850). For example, one of the actions may be to display "Order Details" for a particular order, and the "Order Details" action may require an Order Number in order to display data regarding the particular order. In this example, the Order Number pertaining to a particular order is stored so that it can be delivered to the "Order Details" action upon being invoked by the user.

A determination is made as to whether there are more targets that match the particular source tag (decision 860). Using the example from above, the Order Number may be used by more than one action within an individual portlet or by additional portlets that have been activated by the user. Each of the actions is added to the pop-up menu so that the user can select the action desired. If there are more targets that match the source tag, decision 860 branches to "yes" branch 865 whereupon the next target is selected from the target table (step 870) and processing loops back to add the action for the selected target to the pop-up menu. This looping continues until all matching actions in the target table have been found and processed, at which time decision 860 branches to "no" branch 875.

A determination is made as to whether there are more than one target (i.e., possible actions) for a given source tag (decision 880). If there are more than one targets for a given tag, decision 880 branches to "yes" branch 885 whereupon a "Broadcast" action is added as a menu item of the pop-up menu (step 890). When selected, the "Broadcast" action sends the data element value (i.e., an Order Number) to each of the actions listed in the pop-up menu list, rather than the user having to select each of the actions listed in the pop-up menu individually. On the other hand, if there are not more than one action included in the pop-up menu, decision 880 branches to "no" branch 892 bypassing step 890. Processing then returns at 895.

FIG. 9 is a flowchart illustrating the steps taken to process a user's selection. Processing commences at 900 whereupon the user selects (i.e., "clicks") on an icon that was displayed as a result of the processing shown in FIGS. 7 and 8 (step 905). A determination is made as to whether the user selected a "Broadcast All Sources" icon (decision 910). If the user did not select a "Broadcast All Sources" icon, decision 910 branches to "no" branch 915 whereupon another determination is made as to whether the user selected a "Broadcast" icon (decision 920). If the user did select a "Broadcast" icon, decision 920 branches to "yes" branch 925 whereupon the broadcast action is processed (predefined process 930, see FIG. 10 for processing details). On the other hand, if the icon was not a "Broadcast All Sources" icon and was not a "Broadcast" icon, decision 920 branches to "no" branch 935 whereupon the action selected by the user is performed passing the value of the associated data element with the action to the target portlet (step 940).

Returning to decision 910, if the icon selected by the user was a "Broadcast All Sources" icon, then decision 910 branches to "yes" branch 945 to broadcast data values for the selected data elements to various target portlets using identified actions. For example, if a source portlet includes information for both "customer" type data and "order" type data, the "Broadcast All Sources" may send the customer ID assigned to the customer to one or more target portlets using customer-type actions and may also send an order ID to one or more portlets using order-type actions. The first data type item is selected (step 950). For example, the first data type might be a "customer ID." The first action for the selected data type is performed passing the data type value to the action (step 970). A determination is made as to whether there are additional actions for the selected data type (decision 975). If there are additional actions for the selected data type, decision 975 branches to "yes" branch 978 whereupon the next action for the selected data type is performed again passing the data type value (i.e., a customer ID) to the action (step 980). Processing loops back to determine if there are additional actions to perform for the selected data type. This looping continues until there are no more actions to perform for the selected data type, at which point decision 975 branches to "no" branch 982.

A determination is made as to whether there are more data types in the selected portlet (decision 985). If there are additional data types, decision 985 branches to "yes" branch 988 whereupon the next data type is selected (step 990) and processing loops back to process the newly selected data type. This looping continues until there are no more data types to process, at which point decision 985 branches to "no" branch 992. Processing of the user's selection ends at 995.

FIG. 10 is a flowchart illustrating the steps taken to process a "broadcast" type action. Processing commences at 1000 whereupon a detection is made that the user has selected an icon that was displayed for a data item indicating that the data item is a source for at least one target portlet (step 1010). Because this is a "Broadcast" type action, at least two target portlets have been identified. The first action for the data type is performed passing the value of the data item to the action (step 1020).

A determination is made as to whether there are additional actions to perform (decision 1030). Because this is a "Broadcast" type action, this condition will be true at least once. If there are additional actions, decision 1030 branches to "yes" branch 1050 whereupon the next action for the data type is performed again passing the data item value as a parameter (step 1060). Processing loops back to determine if there are more actions to process. This looping continues until all actions identified for the data type have been processed, at which point decision 1030 branches to "no" branch 1070 and processing ends at 1095.

Figure 11:
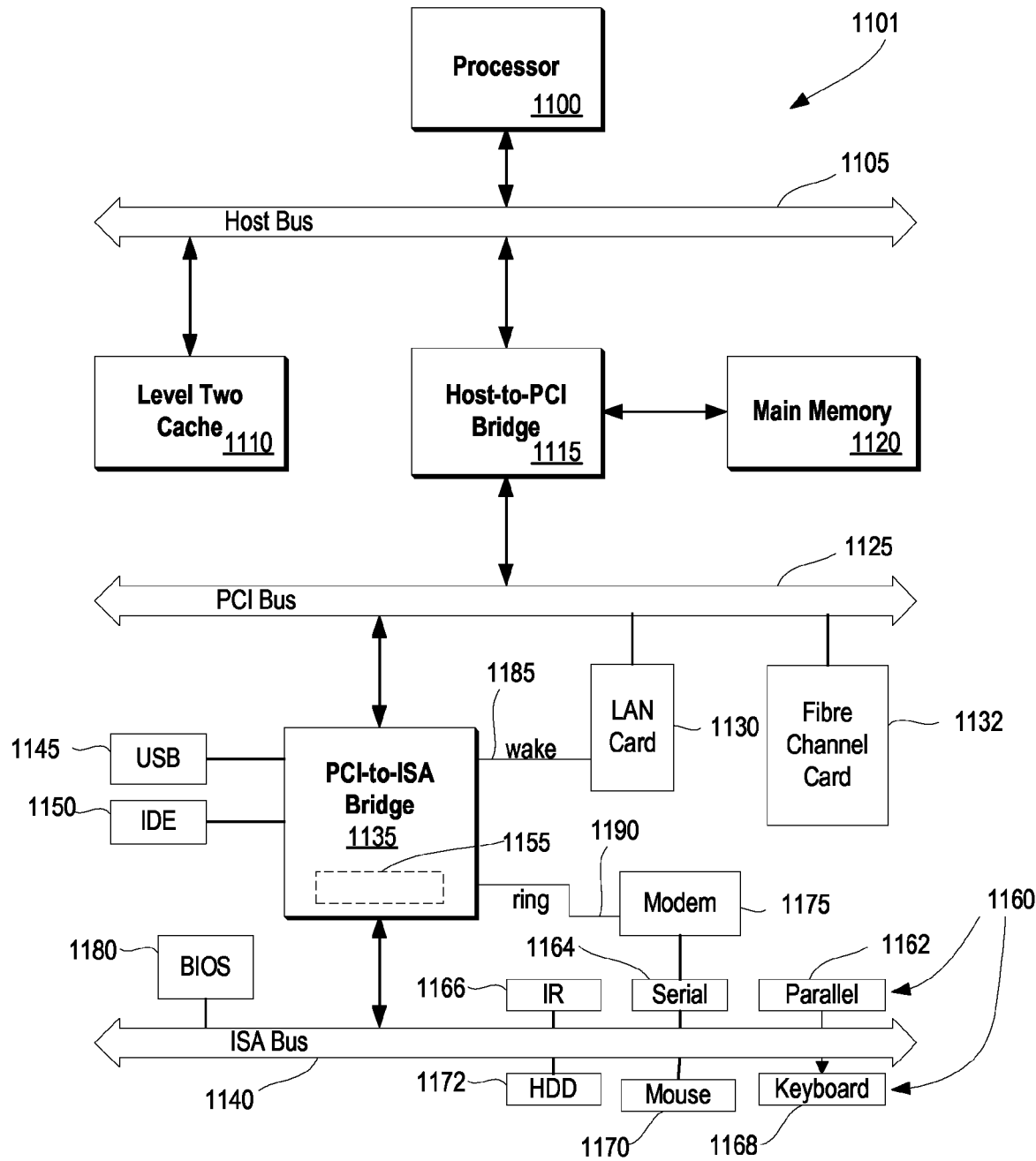
FIG. 11 is a block diagram of a computing device capable of implementing the translation of normalized position settings to vehicle-specific settings and vice-versa.

FIG. 11 illustrates information handling system 1101 which is a simplified example of a computer system capable of performing the systems and methods described herein. Computer system 1101 includes processor 1100 that is coupled to host bus 1105. A level two (L2) cache memory 1110 is also coupled to the host bus 1105. Host-to-PCI bridge 1115 is coupled to main memory 1120, includes cache memory and main memory control functions, and provides bus control to handle transfers among PCI bus 1125, processor 1100, L2 cache 1110, main memory 1120, and host bus 1105. PCI bus 1125 provides an interface for a variety of devices including, for example, LAN card 1130 and Fibre Channel Card 1132. PCI-to-ISA bridge 1135 provides bus control to handle transfers between PCI bus 1125 and ISA bus 1140, universal serial bus (USB) functionality 1145, IDE device functionality 1150, power management functionality 1155, and can include other functional elements not shown, such as a real-time clock (RTC), DMA control, interrupt support, and system management bus support. Peripheral devices and input/output (I/O) devices can be attached to various interfaces 1160 (e.g., parallel interface 1162, serial interface 1164, infrared (IR) interface 1166, keyboard interface 1168, mouse interface 1170, and fixed disk (FDD) 1172 coupled to ISA bus 1140. Alternatively, many I/O devices can be accommodated by a super I/O controller (not shown) attached to ISA bus 1140.

BIOS 1180 is coupled to ISA bus 1140 and incorporates the necessary processor executable code for a variety of low-level system functions and system boot functions. BIOS 1180 can be stored in any computer readable medium, including magnetic storage media, optical storage media, flash memory, random access memory, read only memory, and communications media conveying signals encoding the instructions (e.g., signals from a network). In order to attach computer system 1101 another computer system to copy files over a network, LAN card 1130 is coupled to PCI-to-ISA bridge 1135 via wake 1185. Similarly, to connect computer system 1101 to an ISP to connect to the Internet using a telephone line connection, modem 1175 is connected to serial port 1164 and PCI-to-ISA Bridge 1135 via ring 1190.

While the computer system described in FIG. 11 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for integrating portlets within a portal infrastructure, said method comprising:
   registering, by a computing device, one or more target portlet actions for one or more target portlets within the portal infrastructure, the registering including receiving the target portlet actions and a target portlet name corresponding to each of the received target portlet actions;
   assembling, by the computing device, a portal page for a user, wherein the assembling further includes:
   identifying a source data type included in a source portlet;
   determining that the source data type matches a plurality of data types corresponding to the one or more registered target portlet actions; and
   in response to the determining, displaying a visual control proximate to a displayed data value included on the source portlet that corresponds to the matched source data type;
   in response to determining that the source data type matches a plurality of data types, creating a broadcast action that is adapted to perform each of the plurality of target portlet actions whose data type matches the source data type, wherein the broadcast action is adapted to send a data value from the source portlet to one or more of the target portlets;
   receiving a user request that selects the visual control located on the source portlet; and
   in response to receiving the user request, displaying a pop-up menu that includes the broadcast action and one or more of the target portlet names corresponding to one or more of the plurality of target portlet actions whose data type matches the source data type.

2. The method of claim 1 further comprising:
   detecting the user selecting one of the target portlet names included in the pop-up menu;
   in response to the detecting, performing the registered target portlet action corresponding to the selected target portlet name, wherein the performing includes passing the data value corresponding to the source data type to the target portlet action.

3. The method of claim 2 further comprising:
   receiving the data value at one of the target portlets associated with the target portlet action;
   retrieving responsive data at the associated target portlet; and
   displaying the responsive data at the associated target portlet.

4. The method of claim 1 further comprising:
   receiving a request from the user that selects the broadcast action from the pop-up menu; and
   in response to receiving a request from the user that selects the broadcast action from the pop-up menu, performing each of the plurality of target portlet actions whose data type matches the source data, wherein the performing includes passing the data value corresponding to the source data type to each of the plurality of target portlet actions.

5. The method of claim 4 further comprising:
receiving the data value at a plurality of the target portlets, wherein each of the plurality of target portlets is associated with at least one of the target portlet actions;
retrieving responsive data at each of the associated target portlets; and
displaying the responsive data at the associated target portlets.

6. An information handling system comprising:
one or more processors;
a memory accessible by the processors;
a nonvolatile storage device accessible by the processors and adapted to read a removable storage medium;
a display screen accessible by the processors;
a portal infrastructure, results of which are displayed on the display screen, that includes a plurality of portlets; and
a portlet integration tool for integrating the portlets within the portlet infrastructure, the portlet integration tool including:
   registration logic for registering one or more target portlet actions for one or more portlets within the portal infrastructure, the registering including receiving the target portlet actions and a target portlet name corresponding to each of the received target portlet actions;
   rendering logic for assembling a portal page for a user, wherein the rendering logic further includes:
      identification logic for identifying a source data type included in a source portlet;
      determination logic for that the source data type matches a plurality of data types corresponding to the one or more registered target portlet actions; and
      in response to the determining, display logic for displaying a visual control proximate to a displayed data value included on the source portlet that corresponds to the matched source data type;
   in response to determining that the source data type matches a plurality of data types, generation logic for creating a broadcast action that is adapted to perform each of the plurality of target portlet actions whose data type matches the source data type, wherein the broadcast action is adapted to send a data value from the source portlet to one or more of the target portlets;
   reception logic for receiving a user request that selects the visual control located on the source portlet; and
   in response to receiving the user request, logic for displaying a pop-up menu includes the broadcast action and one or more of the target portlet names corresponding to one or more of the plurality of target portlet actions whose data type matches the source data type.

7. The information handling system of claim 6 further comprising:
detection logic for detecting the user selecting one of the target portlet names included in the pop-up menu;
in response to the detecting, logic for performing the registered target portlet action corresponding to the selected target portlet name, wherein the performing includes passing the data value corresponding to the source data type to the target portlet action.

8. The information handling system of claim 7 further comprising:
input logic for receiving the data value at one of the target portlets associated with the target portlet action;
data retrieval logic for retrieving responsive data at the associated target portlet; and
display logic for displaying the responsive data at the associated target portlet.

9. The information handling system of claim 6 further comprising:
input logic for receiving a request from the user that selects the broadcast action from the pop-up menu; and
in response to receiving a request from the user that selects the broadcast action from the pop-up menu, logic for performing each of the plurality of target portlet actions whose data type matches the source data, wherein the performing includes passing the data value corresponding to the source data type to each of the plurality of target portlet actions.

10. The information handling system of claim 9 further comprising:
input logic for receiving the data value at a plurality of the target portlets, wherein each of the plurality of target portlets is associated with at least one of the target portlet actions;
data retrieval logic for retrieving responsive data at each of the associated target portlets; and
display logic for displaying the responsive data at the associated target portlets.

11. A computer program product stored in a non-transitory computer operable media, the computer operable media containing instructions for execution by a computer, which, when executed by the computer, cause the computer to implement a method of integrating portlets within a portal infrastructure, the method comprising:
registering one or more target portlet actions for one or more portlets within the portal infrastructure, the registering including receiving the target portlet actions and a target portlet name corresponding to each of the received target portlet actions;
assembling a portal page for a user, wherein the assembling further includes:
identifying a source data type included in a source portlet;
determining that the source data type matches a plurality of data types corresponding to the one or more registered target portlet actions; and
in response to the determining, displaying a visual control proximate to a displayed data value included on the source portlet that corresponds to the matched source data type;
in response to determining that the source data type matches a plurality of data types, creating a broadcast action that is adapted to perform each of the plurality of target portlet actions whose data type matches the source data type, wherein the broadcast action is adapted to send a data value from the source portlet to one or more of the target portlets;
receiving a user request that selects the visual control located on the source portlet; and
in response to receiving the user request, displaying a pop-up menu that includes the broadcast action and one or more of the target portlet names corresponding to one or more of the plurality of target portlet actions whose data type matches the source data type.

12. The computer program product of claim 11 wherein the method further comprises:
detecting the user selecting one of the target portlet names included in the pop-up menu;
in response to the detecting, performing the registered target portlet action corresponding to the selected target portlet name, wherein the performing includes passing the data value corresponding to the source data type to the target portlet action.

13. The computer program product of claim 12 wherein the method further comprises:
- receiving the data value at one of the target portlets associated with the target portlet action;
- retrieving responsive data at the associated target portlet; and
- displaying the responsive data at the associated target portlet.

14. The computer program product of claim 11 wherein the method further comprises:
- receiving a request from the user that selects the broadcast action from the pop-up menu; and
- in response to receiving a request from the user that selects the broadcast action from the pop-up menu, performing each of the plurality of target portlet actions whose data type matches the source data, wherein the performing includes passing the data value corresponding to the source data type to each of the plurality of target portlet actions.

15. The computer program product of claim 14 wherein the method further comprises:
- receiving the data value at a plurality of the target portlets, wherein each of the plurality of target portlets is associated with at least one of the target portlet actions;
- retrieving responsive data at each of the associated target portlets; and
- displaying the responsive data at the associated target portlets.

* * * * *